(12) United States Patent
Wijesundera et al.

(10) Patent No.: US 12,141,312 B2
(45) Date of Patent: *Nov. 12, 2024

(54) METHODS, SYSTEMS AND MACHINE-READABLE PROGRAMS FOR COMMUNICATING SELF DESTRUCTIVE MESSAGES

(71) Applicant: BoardPAC Private Limited, Nawam Mawatha (LK)

(72) Inventors: Lakmini Wijesundera, Nawam Mawatha (LK); Sanjeewa Widyaratne, Austin, TX (US)

(73) Assignee: BoardPAC Private Limited, Nawan Mawatha (LK)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,033

(22) Filed: Aug. 18, 2023

(65) Prior Publication Data
US 2023/0394165 A1 Dec. 7, 2023

Related U.S. Application Data

(63) Continuation of application No. 17/480,237, filed on Sep. 21, 2021, now abandoned, which is a
(Continued)

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *G06Q 10/107* (2013.01);
(Continued)

(58) Field of Classification Search
CPC .............. G06F 21/6218; G06F 21/602; G06F 2221/2113; G06F 2221/2143;
(Continued)

(56) References Cited

U.S. PATENT DOCUMENTS 6,721,784 B1 * 4/2004 Leonard ................. H04L 51/18
709/204
7,149,893 B1 * 12/2006 Leonard ................. H04L 51/48
709/217
(Continued)

FOREIGN PATENT DOCUMENTS

WO WO 2000/0051032 A1 8/2000
WO WO 2019/0186388 A1 10/2019

OTHER PUBLICATIONS

Henry P et al., "Off the record email system", Proceedings IEEE Infocom 2001, Conference on computer communications. Twentieth annual joint conference of the IEEE computer and communications society (Cat. No. 01CH37213).
(Continued)

*Primary Examiner* — Matthew Smithers
(74) *Attorney, Agent, or Firm* — De Witt LLP; Brian R. Pollack, Esq.

(57) ABSTRACT

Provided herein are methods, systems and machine-readable programs for enabling a secure channel for communicating self-destructive messages. In an embodiment, a method, system and machine-readable program are provided for generating, communicating and receiving the self-destructive message is disclosed.

18 Claims, 10 Drawing Sheets

Related U.S. Application Data continuation of application No. 16/362,808, filed on Mar. 25, 2019, now Pat. No. 11,126,738.

(60) Provisional application No. 62/648,764, filed on Mar. 27, 2018.

(51) Int. Cl.

| | |
|---|---|
| *G06Q 10/107* | (2023.01) |
| *H04L 9/06* | (2006.01) |
| *H04L 9/08* | (2006.01) |
| *H04L 9/14* | (2006.01) |
| *H04L 9/32* | (2006.01) |
| *H04L 9/40* | (2022.01) |
| *H04L 51/04* | (2022.01) |
| *H04L 51/18* | (2022.01) |
| *H04L 51/234* | (2022.01) |
| *H04W 12/033* | (2021.01) |
| *H04W 12/61* | (2021.01) |
| *H04W 12/63* | (2021.01) |
| *H04L 67/52* | (2022.01) |

(52) U.S. Cl.
CPC .......... *H04L 9/0631* (2013.01); *H04L 9/0841* (2013.01); *H04L 9/0844* (2013.01); *H04L 9/14* (2013.01); *H04L 9/32* (2013.01); *H04L 9/321* (2013.01); *H04L 51/04* (2013.01); *H04L 51/18* (2013.01); *H04L 51/234* (2022.05); *H04L 63/0428* (2013.01); *H04L 63/061* (2013.01); *H04L 63/08* (2013.01); *H04L 63/105* (2013.01); *H04L 63/107* (2013.01); *H04W 12/033* (2021.01); *H04W 12/61* (2021.01); *H04W 12/63* (2021.01); *G06F 2221/2113* (2013.01); *G06F 2221/2143* (2013.01); *H04L 63/0853* (2013.01); *H04L 67/52* (2022.05)

(58) Field of Classification Search
CPC ... G06Q 10/107; H04L 9/0631; H04L 9/0841; H04L 9/0844; H04L 9/14; H04L 9/32; H04L 9/321; H04L 51/04; H04L 51/18; H04L 51/234; H04L 63/0428; H04L 63/061; H04L 63/08; H04L 63/105; H04L 63/107; H04L 63/0853; H04L 67/52; H04L 9/3226; H04W 12/033; H04W 12/61; H04W 12/63
See application file for complete search history.

(56) References Cited

U.S. PATENT DOCUMENTS

| | | | |
|---|---|---|---|
| 7,191,219 B2* | 3/2007 | Udell | G06F 21/6245 709/201 |
| 8,364,764 B2* | 1/2013 | Hartselle | H04L 65/4025 709/205 |
| 8,572,696 B1 | 10/2013 | Wiacek | |
| 9,397,964 B2 | 7/2016 | Hartselle | |
| 9,760,590 B2* | 9/2017 | Speede | H04W 12/08 |
| 11,108,719 B2* | 8/2021 | Bhagwan | H04L 51/18 |
| 11,126,738 B2* | 9/2021 | Wijesundera | H04L 9/3226 |
| 2002/0120869 A1 | 8/2002 | Engstrom | |
| 2002/0129275 A1* | 9/2002 | Decuir | H04L 63/0428 726/28 |
| 2003/0126215 A1 | 7/2003 | Udell et al. | |
| 2003/0126463 A1 | 7/2003 | Sistla | |
| 2004/0139314 A1 | 7/2004 | Cook | |
| 2005/0039004 A1 | 2/2005 | Adams et al. | |
| 2006/0036740 A1 | 2/2006 | Hagale | |
| 2010/0304766 A1 | 12/2010 | Goyal | |
| 2011/0173683 A1* | 7/2011 | Roach | H04L 63/104 726/4 |
| 2011/0213845 A1* | 9/2011 | Logan | H04L 51/18 709/206 |
| 2012/0203849 A1 | 8/2012 | Collins et al. | |
| 2013/0074195 A1 | 3/2013 | Johnston et al. | |
| 2013/0097248 A1* | 4/2013 | Chakra | G06Q 10/107 709/206 |
| 2013/0159436 A1 | 6/2013 | Hartselle et al. | |
| 2014/0173008 A1 | 6/2014 | Roskowski et al. | |
| 2014/0201527 A1* | 7/2014 | Krivorot | G06F 21/6209 713/168 |
| 2014/0207887 A1 | 7/2014 | Hartselle et al. | |
| 2014/0331188 A1* | 11/2014 | Sandstrom | G06F 3/04883 345/173 |
| 2015/0180845 A1 | 6/2015 | Uomini | |
| 2015/0269216 A1* | 9/2015 | Speede | G06F 16/2358 707/689 |
| 2015/0326510 A1 | 11/2015 | Tomlinson | |
| 2016/0057156 A1* | 2/2016 | Lin | H04W 12/02 713/170 |
| 2016/0164816 A1 | 6/2016 | Bhagwan | |
| 2016/0294787 A1* | 10/2016 | Moore | H04L 63/102 |
| 2018/0063091 A1* | 3/2018 | Lancioni | H04N 1/32144 |
| 2018/0152471 A1* | 5/2018 | Jakobsson | H04L 63/1425 |

OTHER PUBLICATIONS

International Search Report Appended to WO2019186388.
Written Opinion dated Oct. 3, 2019 relating to WO2019186388.
Application and File History for U.S. Appl. No. 17/480,237, filed Sep. 21, 2021. Inventor: Wijesundera et al.

* cited by examiner

METHODS, SYSTEMS AND MACHINE-READABLE PROGRAMS FOR COMMUNICATING SELF DESTRUCTIVE MESSAGES

CROSS-REFERENCE TO RELATED APPLICATIONS

The present patent application claims the benefit of priority to and is a continuation of U.S. patent application Ser. No. 17/480,237, filed Sep. 21, 2021, which claims the benefit of priority to and is a continuation of U.S. patent application Ser. No. 16/362,808, filed Mar. 25, 2019, now U.S. Pat. No. 11,126,738, which is incorporated by reference herein in its entirety for all purposes. U.S. patent application Ser. No. 16/362,808 in turn claims the benefit of U.S. Provisional Patent Application No. 62/648,764, filed Mar. 27, 2018.

TECHNICAL FIELD

The present disclosure relates to the field of secure electronic communication.

BACKGROUND

Communication technologies have assisted in building an ecosystem that promotes relatively faster decision-making processes within an organization. Normally, a decision maker uses a device such as a mobile phone to communicate confidential as well as non-confidential information through messages. The information remains within the device until the decision maker deletes the messages. Thus, the information is susceptible to leakage on any unauthorized access to the messages or the device. Further, it is imperative for the organization to maintain confidentiality of these messages when a matter pursued by the decision maker is of highly confidential nature. Any unauthorized access to these messages can result in damage to competencies, integral values, competitive edge or can create a security menace for the organization.

In view of the foregoing discussion, therefore there exists a need for methods, systems, and machine-readable programs for securely communicating messages which include highly confidential information and are susceptible to theft.

SUMMARY

The purpose and advantages of the present disclosure will be set forth in and become apparent from the description that follows. Additional advantages of the disclosed embodiments will be realized and attained by the methods and systems particularly pointed out in the written description hereof, as well as from the appended drawings.

The disclosure is generally directed to methods, systems and machine-readable programs for enabling a secure channel for communicating self-destructive messages.

In some implementations, computer-implemented methods, systems, and non-transitory machine-readable media including machine-readable instructions to control at least one processor circuit are provided that facilitate providing an electronic tool to a user to facilitate communicating self-destructive messages between a first user and a second user via at least one processor circuit. The at least one processor circuit can be programmed to render indicia identifying a plurality of message categories on a first user interface of a first user device for the first user, wherein each message category corresponds to a respective security level required to be established for the message until the message is read by the second user on a second user interface of a second user device. The processor can be further programmed to receive at the server the message, at least one message category, and a message display interval from the first user device in accordance with the security level associated with the at least one message category, and to authenticate a request of the second user to access the message. The processor can be still further configured to transmit the message, the at least one message category and the message display interval from the server toward the second user device in accordance with the security level associated with the at least one message category, wherein the second user device is configured to destruct the message on expiry of the message display interval when the second user has read the message on the second user interface.

If desired, the plurality of message categories can include a highly sensitive message, a medium level sensitive message, a low-level sensitive message and a normal message. The at least one processor circuit can be further programmed to transmit the message from the first user device to the server OR from the server to the second user device using (i) a first security protocol when the at least one message category corresponds to the low-level sensitive message, (ii) a second security protocol when the at least one message category corresponds to the medium level sensitive message, and a third security protocol when the at least one message category corresponds to the highly sensitive message.

If desired, the at least one processor circuit can be further programmed to receive current geographic co-ordinates of the first user and the second user, compare the current geographic co-ordinates of the first user and the second user with respective pre-stored geographic co-ordinates of the first user and the second user to determine location of the first user and the second user within or near to a predetermined location, and authorize the first user and the second user to establish communication of the self-destructive messages, when the current geographic co-ordinates of the first user and the second user are found within or near to the predetermined location. If desired, the at least one processor circuit can be further programmed to receive authentication related information from the first user or the second user from another computing device, and determine a presence of a suspicious activity based on the authentication related information and the current geographic co-ordinates of the first user or the second user, wherein the presence of suspicious activity indicates a presence of an intruder as the first user or the second user.

In some embodiments, the at least one processor circuit can be further programmed to provide instructions to the first user device to cipher the message using a triple data encryption algorithm (TDES) before transmitting the message to the server, when the at least one message category corresponds to the low-level sensitive message, and provide instructions to the second user device to decipher the message using the triple data encryption algorithm (TDES) upon receiving the message from the server. The at least one processor circuit can be further programmed to provide instructions to the first user device to cipher the message using an advanced encryption standard (AES) before transmitting the message to the server, when the at least one message category corresponds to the medium level sensitive message, and provide instructions to the second user device to decipher the message using the advanced encryption standard (AES) upon receiving the message from the server.

In some embodiments, the at least one processor circuit can be further programmed to provide instructions to the first user device to cipher the message using at least Diffie Hellman keys before transmitting the message to the server, when the at least one message category corresponds to the highly sensitive message, and provide instructions to the second user device to decipher the message using the Diffie Hellman keys upon receiving the message from the server. The first user interface can be configured to receive a server store time indicating a time interval for storing the message at the server until another user reads the message, and the message can be destroyed if the message is not read within the server store time.

In some implementations, computer-implemented methods, systems, and non-transitory machine-readable media including machine-readable instructions to control at least one processor circuit are provided that facilitate providing an electronic tool to a user to facilitate generating a self-destructive message via the at least one processor circuit, wherein the at least one processor circuit can be programmed to receive a request from a first user for a second user on a first user interface to create a message, render indicia identifying a plurality of categories on the first user interface, wherein each category of the plurality of categories corresponds to a respective security level required to be established for the message until the message is read by another user on a second user interface, and further wherein at least one category from the plurality of categories corresponds to a self-destructive message category, receive an input from the first user regarding a selection of the at least one category from the plurality of categories for the message, receive at least one timing related input from the first user corresponding to the message, wherein the at least one timing related input includes a self-destructive interval for the message, and communicate the message, indicia relating to the at least one selected category, and the at least one timing related input to the server configured to deliver the message to the second user interface where the message is automatically destructed after expiry of the self-destructive interval when the second user has read the message.

In some embodiments, the at least one processor circuit can be further programmed to render a list of other users or a group of users on the first user interface, receive a selection of at least one another user from the list for sending the message, and transmit information to the server to communicate the message to the second user and another user. The at least one processor circuit can be further programmed to authenticate the first user and the second user prior to communicating the message therebetween. If desired, the at least one processor circuit can be further programmed to render a plurality of colored areas representing the respective plurality of categories on the first user interface, wherein first colored area has a first color which is different from a second color of the second colored area.

In some implementations, computer-implemented methods, systems, and non-transitory machine-readable media including machine-readable instructions to control at least one processor circuit are provided that facilitate communicating a self-destructive message via at least one processor circuit. The at least one processor can be programmed to receive a self-destructive message, wherein the self-destructive message includes subject matter identification information and timing information, said timing information corresponding to an amount of time after which the self-destructive message deletes, analyze the subject matter identification information to determine whether the message relates to one of a plurality of predefined subject matter categories, wherein the plurality of predefined subject matter categories includes at least one sensitivity-based category, apply a security protocol to the message corresponding to the at least one sensitivity-based category, said security protocol affecting the manner in which the message is transmitted, and transmit the self-destructive message to another user device in accordance with the security protocol.

In some embodiments, the at least one processor circuit can be further programmed to communicate said self-destructive message using: (i) a first security protocol when the message corresponds to a first sensitivity based category, (ii) a second security protocol different from the first security protocol when the message corresponds to a second sensitivity based category, and (iii) a third security protocol different from the first and second security protocols when the message corresponds to a third sensitivity based category. The timing information can further include a server store time indicating a time interval for storing the message at the server until another user reads the message, and the at least one processor circuit can be further programmed to destroy the message if the message is not read within the server store time.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE FIGURES

In the accompanying figures, like reference numerals refer to identical or functionally similar elements throughout the separate views and together with the detailed description below are incorporated in and form part of the specification, serve to further illustrate various embodiments and to explain various principles and advantages all in accordance with the systems, methods and machine-readable programs disclosed herein.

Figure 1:
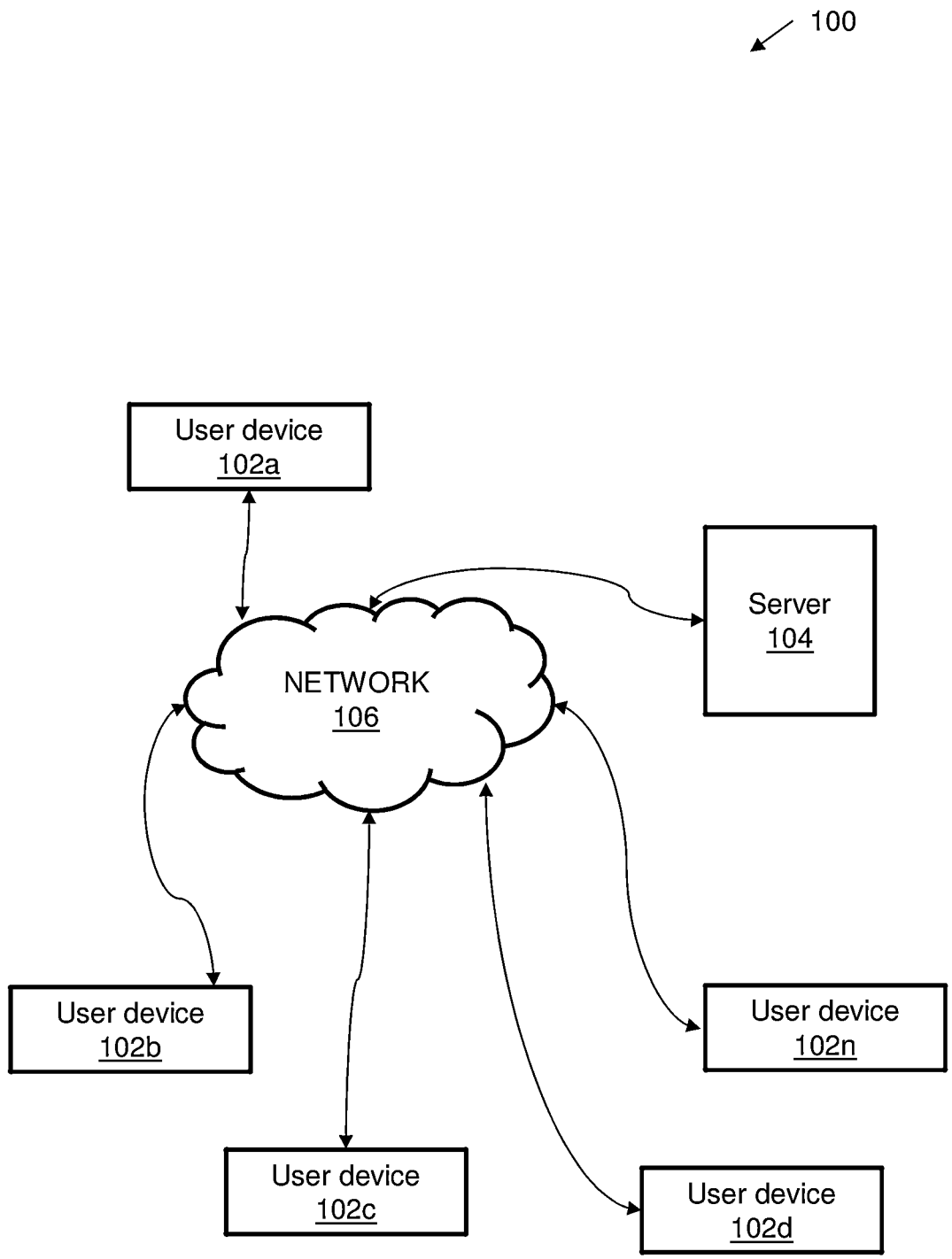
FIG. 1 illustrates an exemplary system architecture for communicating a self-destructive message in accordance with an embodiment of the systems and methods disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Before describing in detail embodiments that are in accordance with the systems and methods disclosed herein, it should be observed that the embodiments reside primarily in combinations of method steps and/or system components related to enabling a user to associate a service with a product in a way that makes it much more convenient and effective for the user to take advantage of the benefits of the service in connection with the product. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

FIG. 1 illustrates an exemplary system architecture 100 for communicating a self-destructive message in accordance with an embodiment of the systems and methods disclosed herein. The system 100 includes a plurality of user devices such as a user device 102a, a user device 102b, a user device 102c, a user device 102d, and a user device 102n, collectively referred herein to as the user device 102. Each of the user device 102 is communicatively coupled to a server 104 and other user devices through a network 106.

The user device 102 can include a computing device such as a personal computer, a laptop or a notebook computer, a mobile or cellular telephone, a personal digital assistant (PDA), or another type of computation or communication device. Depending on the type of a user, the user device 102 may also be referred to as a sending user device 102 or a receiving user device 102. The user who sends the self-destructive message through the sending user device 102 may be referred to a sending user and the user(s) who receives the self-destructive message may also be referred to as a receiving user. For example, when the sending user corresponding to the user device 102a sends the self-destructive message to other user devices such as the user device 102b and the user device 102c, the user device 102a is referred to as the sending user device 102 and the user device 102b and user device 102c are referred to as the receiving user devices 102. As it is well known to a person skilled in the art, the sending user device 102 can be the receiving user device 102 too and the receiving user device 102 can be the sending user device 102.

The network 106 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

In an embodiment, the user device 102a is configured to send secure messages such as a self-destructive message to another user device 102b. The self-destructive message is configured to be automatically removed from the receiving user device 102b when it is determined that the self-destructive message has been displayed on a user interface of the receiving user device 102b. Such type of automatic removal of the self-destructive messages at the receiving user device 102b enable the system 100 to facilitate secure access to the self-destructive messages as well as destruction of the self-destructive messages after a predetermined amount of time. In another embodiment, the user device 102a may send the self-destructive message to a group of user devices 102. In such instances, the self-destructive message is automatically removed from each receiving user device of the group of the user devices 102 when the self-destructive message is displayed on the respective user interfaces.

In an embodiment, the user device 102 is configured to include an application configured to provide self-destructive message related feature. In another embodiment, the user device 102 is configured to include an inbuilt self-destructive message related feature.

In an embodiment, the user device 102 is configured to provide a first user interface to create a self-destructive message so that the self-destructive message can be shared amongst other user devices 102. For example, the first user interface is configured to include an indicia identifying a plurality of message categories wherein each message category corresponds to a respective security level required to be established for the message until the message is read by the second user on a second user interface of a second user device. Further, the first user interface includes a message creating portion configured to receive a plurality of inputs from the user. The plurality of inputs can include an input related to but is not limited to a selection of: a new message as the self-destructive message or a non self-destructive message, content of the self-destructive message, a group of users or individual users identified as the receivers of the self-destructive message, network related parameters and other user inputs essential for creating the self-destructive message.

In an embodiment, the user may simply classify the message in a self-destructive message category or a non self-destructive message category. The self-destructive message category is a category for those messages which are required to be automatically removed from the user device 102 of the receiving user once the self-destructive message is read by a respective receiving user device 102. The system may simply implement a predetermined security protocol for the message classified in the self-destructive message category without requiring further inputs from the user. The non self-destructive message category is a category for those messages which are not required to be removed from the receiving user. The non self-destructive message remains within the user device 102 of the receiving user and the receiving user can manually remove the non self-destructive message after reading the non self-destructive message at a later time.

In an embodiment, a plurality of categories is rendered on the first user interface so that the user selects a specific category for the self-destructive message. Each category of the plurality of categories corresponds to a respective security protocol required to be implemented for the self-destructive message till the self-destructive message is read by another user on a second user interface of the receiving user device 102.

For example, for a first type of self-destructive message category, a first type of security protocol is setup for communicating the message between the user device 102a, the server 104 and other user devices 102. For example, for a second type of self-destructive message category, a second type of security protocol is setup for communicating the message between the user device 102a, the server 104 and other user devices 102. For example, for a third type of self-destructive message category, a third type of security protocol is setup for communicating the message between the user device 102a, the server 104 and other user devices 102.

In an embodiment, the different types of the self-destructive message categories are dependent on the sensitivity associated with the self-destructive message. For example, the first type of self-destructive message category refers to a low sensitive self-destructive message. The second type of self-destructive message category refers to a medium sensitive self-destructive message. The third type of self-destructive message category refers to a highly sensitive self-destructive message.

In an embodiment, the user input is received at the first user interface regarding selection the category for classification of the self-destructive message. For example, the user may classify the self-destructive message in the first type of self-destructive message category depending on the sensitivity of the information involved in the self-destructive message. Alternatively, the user may select the self-destructive message category depending on an urgency associated with the self-destructive message.

Further, user device 102 is configured to receive one or more timing related input from the user corresponding to the self-destructive message. In an embodiment, the timing related information includes a self-destructive interval for the self-destructive message. The self-destructive interval for the self-destructive message includes an interval after which the self-destructive message is automatically destructed on the second user interface after the self-destructive message is read by the receiving user. In addition, the user device 102 is configured to receive another timing related input from the user corresponding to the self-destructive message. The timing related input corresponds to an interval for which the self-destructive message is stored at the server 104 till another user reads the self-destructive message.

In an embodiment, the user device 102 is configured to automatically assign the self-destructive interval and another timing related input for the self-destructive message upon classification of the self-destructive message in any of the above-mentioned types of the self-destructive message category.

In an embodiment, the user device 102a is configured to receive input from the user to communicate the self-destructive message to either one of the other user devices 102 or to two or more other user devices 102. For example, upon receiving an input on a send button on the first user interface, the self-destructive message, its respective category, self-destructive interval and other timing related input is sent to the other receiving user(s) through the server 104.

Depending on the category of the self-destructive message, the sending user device 102 is configured to establish the respective security protocol for sending the self-destructive message to the server 104. For example, the sending user device 102 is configured to communicate the self-destructive message to the server 104 using a first security protocol when the message belongs to a first sensitivity based category. In another example, the sending user device 102 is configured to communicate the self-destructive message to the server 104 using a second security protocol when the self-destructive message belongs to a second sensitivity based category. In a yet another example, the sending user device 102 is configured to communicate the self-destructive message to the server 104 using a third security protocol when the message belongs to a third sensitivity based category.

In an embodiment, the first sensitivity based category is a low sensitivity based category, the second sensitivity based category is a medium sensitivity based category, and the third sensitivity based category is a high sensitivity based category The server 104 is configured to compare the category of the self-destructive message received from the sending user device 102 with the plurality of categories stored at the server 104 or accessible to the server 104. The plurality of categories includes at least the first sensitivity based category, the second sensitivity based category and the third sensitivity based category. Based on the comparison, the server 104 is configured to classify the received self-destructive message in any one of the first sensitivity based category, the second sensitivity based category and the third sensitivity based category.

In an embodiment, the server 104 is configured to implement a fourth security protocol for secure transmission of the self-destructive message to the receiving user when the received self-destructive message is classified in the first sensitivity based category. For example, steps 714 to 722 of a method 700 forms at least a part of the fourth security protocol for secure transmission self-destructive message classified in the first sensitivity based category. In an embodiment, the server 104 is configured to implement a fifth security protocol for secure transmission of the self-destructive message to the receiving user when the received self-destructive message is classified in the second sensitivity based category. For example, steps 724, 726, 720 and 722 of the method 700 forms at least a part of the fifth security protocol for secure transmission self-destructive message classified in the second sensitivity based category. In an embodiment, the server 104 is configured to implement a sixth security protocol for secure transmission of the self-destructive message to the receiving user when the received self-destructive message is classified in the third sensitivity based category. For example, steps 802 to 818 of a method 800 forms at least a part of the sixth security protocol for secure transmission self-destructive message classified in the third sensitivity based category.

A variety of authentication protocols can be used in various combinations (e.g., one or more may be used when sending a message) when a security protocol is used, as set forth herein.

In a first implementation of an authentication protocol, a randomly generated reference number can be used for the sender's identity instead of actual sender's ID. This reference number can be randomly generated, for example, and assigned at session initiation, or at the time that the sender composes a message, or executed a command to send the message. This prevents the sender's id from being tracked when sending a self-destructive message as set forth herein.

In a second implementation of an authentication protocol, the DeviceID of a sender or a recipient is assigned a random number at session initiation by the system. When the respective device then tries to sync to the system or server for any purpose, such as to download a SDM, this random number is validated, and the respective device is thus validated.

In a third implementation of an authentication protocol, the system can utilize the geographic coordinates (supplied by global positioning technology, or "GPS") of a sender and/or recipient. For example, the respective user can register using his or her respective geo-location coordinates that can be provided through the tablet or computer terminal that the user is utilizing to send or receive a self-destructing message. The geographical coordinates of the tablet or computer terminal can be compared with pre-defined coordinate data. If the locations match or are within a certain distance of one another (e.g., 100 meters), the user can be verified.

In an embodiment, the server is configured to receive current geographic co-ordinates of the first user and the second user. Subsequently, the server is configured to compare the current geographic co-ordinates of the first user and the second user with respective pre-stored geographic co-ordinates of the first user and the second user to determine location of the first user and the second user within or near to a predetermined location. The server is configured to authorize the first user and the second user to establish communication of the self-destructive messages, when the current geographic co-ordinates of the first user and the second user are found within or near to the predetermined location. In an embodiment, the server may upon receiving, an authentication related information from the first user or the second user from another computing device, is configured to determining a presence of a suspicious activity based on the authentication related information and the current geographic co-ordinates of the first user or the second user, wherein the presence of suspicious activity indicates a presence of an intruder as the first user or the second user.

For example, in one implementation, a further layer of security can be used, wherein a second and/or third device, such as the user's business and/or personal smart phone, is queried by the system to send its geo-coordinates. The user of said second and/or third device can authorize the sending of coordinates of the respective second or third device, for example, by pressing an image of a button on the smart phone screen, by entering a code, by answering a security question, by scanning their fingerprint on the device, and/or by scanning their retina using the device, or by way of facial recognition technology via the second or third device (e.g., Apple iPhone X). Such techniques can be used to verify the user in the first instance, or they can be used, for example, if the sender's or recipient's actual GPS coordinates differ from those that are expected. If this should occur, the system can notify the sender, recipient, and/or system administrator about the discrepancy. The user that gives rise to the discrepancy can be notified, and that user can be required to manually verify and authorize before permitting the message to be sent, received, and/or decrypted, using a technique, for example, as set forth above. In a further implementation, if the correct user is using the device, but may be under duress, a further radio button or digital actuator can be provided with coded indicia that, on its face, does not appear to be an actuator that informs of an emergency situation. For example, two choices may be provided for selection, including "Verify" and "Verify Urgently", wherein the second actuator, if selected, will cause a signal to be sent to the system, which can automatically alert an administrator or legal authorities that the user has been compromised. The geo coordinates of the device can be transmitted, and, if desired, the microphone and/or camera on the device can be activated and stream audio and/or video to the system. Preferably, when streaming audio and/or video, the software is configured so as to provide no indication on the smart phone that the microphone or camera has been activated.

In further accordance with the disclosure, subsequently, after the user, and/or device has been verified, the server 104 can indicate to the receiving user device(s) 102 that the self-destructive message has arrived at the server 104. Upon receiving the request to retrieve the self-destructive message from receiving user device(s) 102, the server 104 is configured to transmit the received self-destructive message to the respective receiving users using the security protocol as determined in accordance with the category of the received self-destructive message.

In an embodiment, a method for receiving the self-destructive message is disclosed. The receiving user device 102 is configured to include the second user interface so that its respective user can select a particular self-destructive message to retrieve the contents thereof. Subsequently, the receiving user device 102 is configured to generate a request to receive the self-destructive message from a list of plurality of messages displayed on the second user interface.

The server 104 is configured to authorize the receiving user device 102 to receive the self-destructive message and initiate a self-destructive message retrieval process, wherein the self-destructive message retrieval process is dependent on the category of the self-destructive message. On receiving the self-destructive message, the receiving user device 102 is configured to display the self-destructive message on the second user interface and destruct the self-destructive message after an expiry of the self-destructive interval associated with the self-destructive message.

Figure 2:
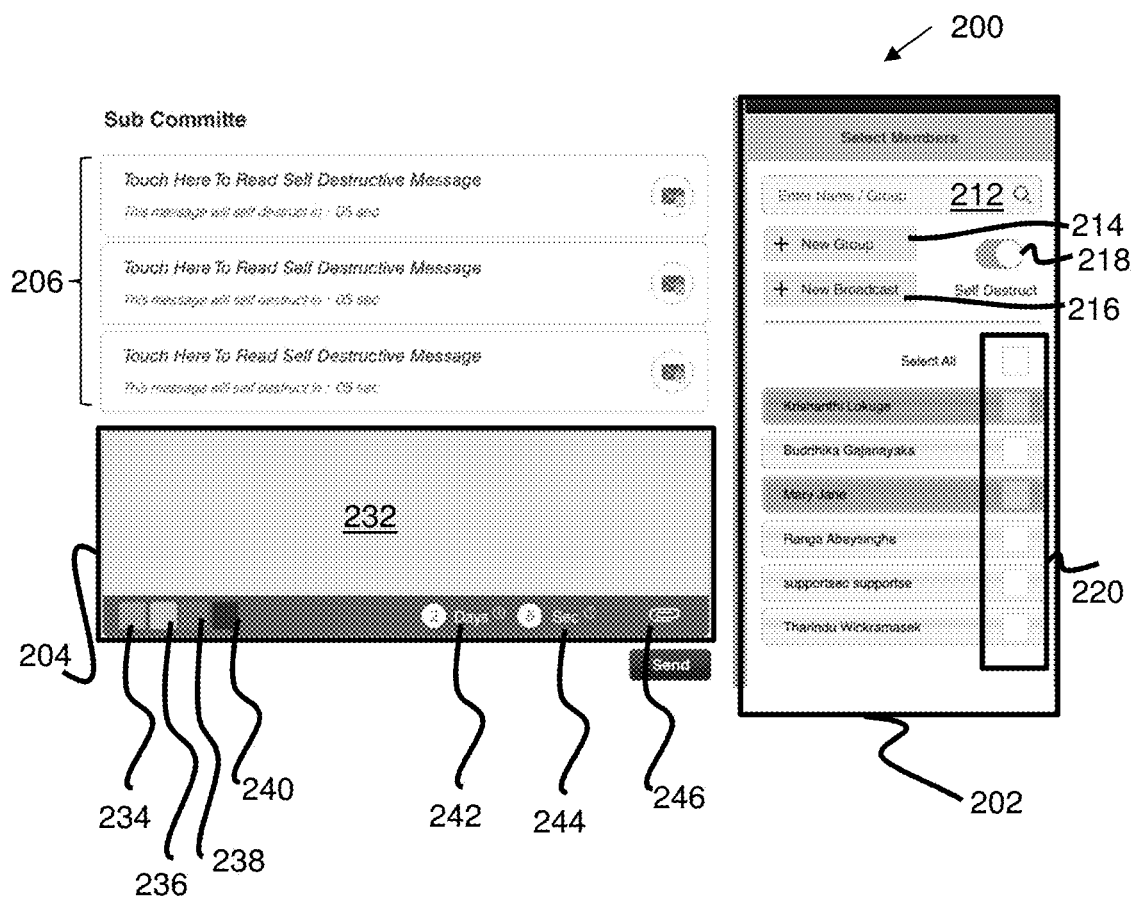
FIG. 2 illustrates exemplary user interface for generating a self-destructive message in accordance with an embodiment of the systems and methods disclosed herein.

FIG. 2 illustrates an exemplary user interface 200 for generating the self-destructive message in accordance with an embodiment of the systems and methods disclosed herein. The user interface 200 is configured to include at least three portions such as a portion 202, a portion 204 and a portion 206. The portion 202 displays one or more selections required to determine receiving users of the self-destructive message and a category of the self-destructive message to be delivered to the receiving users. For example, the portion 202 includes a selection 212 to search for an existing group within an existing group of receiving users, a selection 214 to create a new group of receiving users, a selection 216 to create a new broadcast message among the plurality of receiving users. Further, a selection 218 is shown wherein the sending user can provide an input whether the message to be created belongs to the self-destructive message category or the non self-destructive message category. A selection 220 assists the sending user to select one or more members of the group to whom the sending user intends to deliver the self-destructive message after selecting the respective group.

Further, the portion 204 displays to the sending user various selections to generate the self-destructive message. A message area 232 is provided to the sending user to enter contents of the self-destructive message. For example, as the sending user provides input in the self-destructive message area 232, a keyboard screen (not shown) is displayed to the sending user so that the sending user can enter the contents of the self-destructive message. Further, a plurality of categories such as a category 234, a category 236, a category 238, and a category 240 is shown to the sending user. The sending user selects at least one category for the self-destructive message from the plurality of categories. Further, a plurality of colored areas representing the respective plurality of categories on the first user interface are shown in a manner such that a first colored area representing the first category has a first color which is different from a second color of the second colored area representing the second category.

In an embodiment, the category 234 is a normal category and indicates that the self-destructive messages of the category 234 are normal messages. Such normal messages do not require any form of additional security when the self-destructive messages are sent to the plurality of receiving users. In an embodiment, a green color is assigned to a selection icon of the category 234.

In an embodiment, the category 236 is for the low sensitive self-destructive message and requires a lowest form of protection when the self-destructive message of the category 236 is sent to the plurality of receiving users. In an embodiment, a yellow color is assigned to a selection icon of the category 236.

In an embodiment, the category 238 is for the medium sensitive self-destructive message and accordingly, a medium form of protection is required for the message of this category 238 when the self-destructive message is sent to the plurality of receivers. In an embodiment, an orange color is assigned to a selection icon of the category 238.

In an embodiment, the category 240 is for the highly sensitive self-destructive message and accordingly, requires a highest form of protection when the self-destructive message of the category 240 is sent to the plurality of receivers. In an embodiment, a red color is assigned to a selection of the category 240.

In addition, a selection area 242 is illustrated so that the sending user can indicate to the server 104a a period for which the self-destructive message is stored at the server 104 till the receiving user accesses the self-destructive message. Another selection area 244 facilitates the sending user to associate the self-destructive interval with the self-destructive message. The self-destructive interval indicates that the self-destructive message will be deleted after an expiry of the self-destructive interval once the self-destructive message is displayed on the screen of the receiving user. Additionally, the sending user may specify an attachment using the attachment icon 246 to include additional information in the self-destructive message.

Once the sending user selects the send button, the self-destructive message is sent to the plurality of the receiving users through the server 104 using the corresponding security protocol which depends on the category of the self-destructive message.

Figure 3:
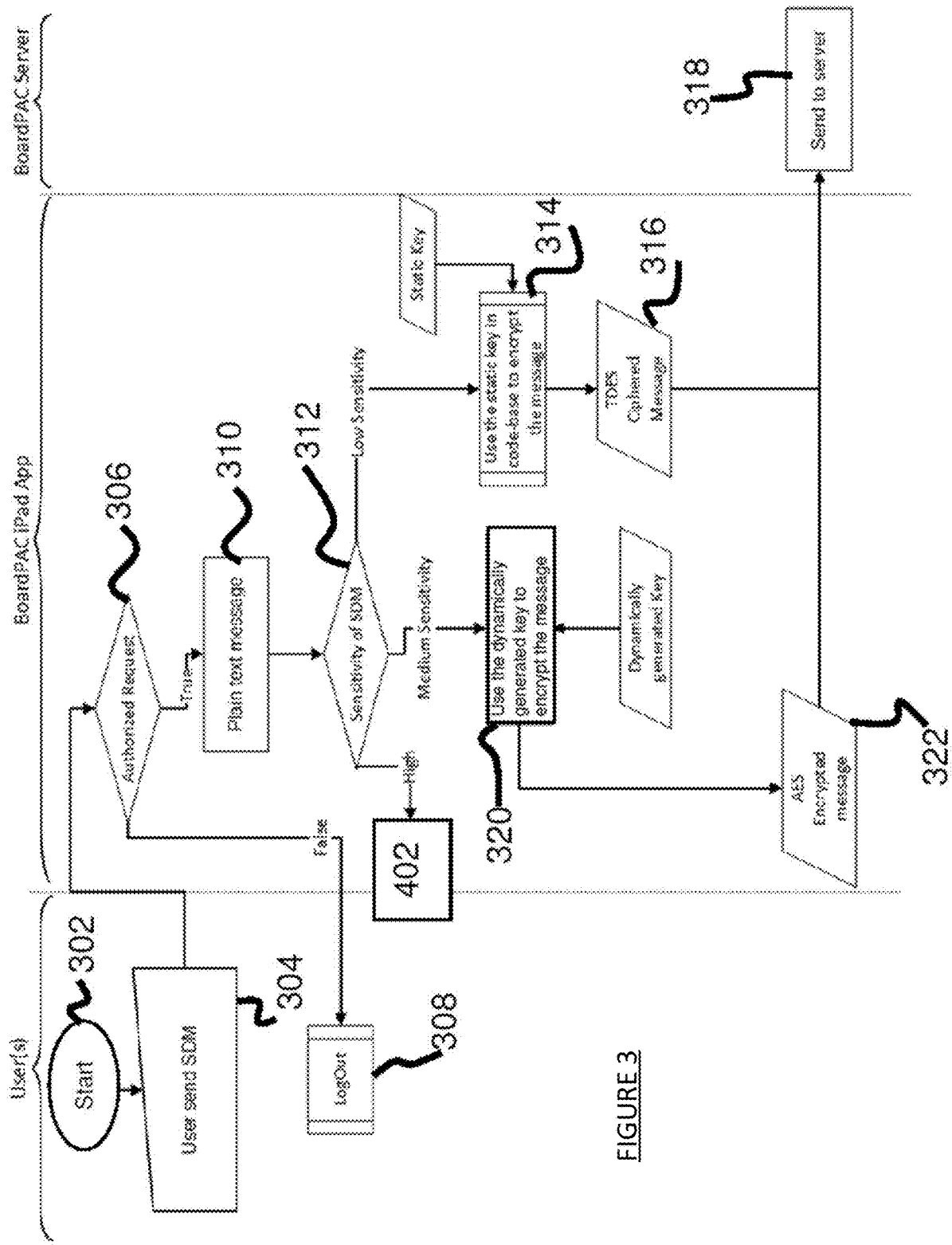
FIG. 3 illustrates exemplary steps of a method for sending the self-destructive message to a server in accordance with an embodiment of the systems and methods described herein.

FIG. 3 illustrates exemplary steps of a method for sending the self-destructive message to the server 104 in accordance with an embodiment of the systems and methods described herein. The method 300 starts at 302 and proceeds to 304. At 304, the sending user sends the self-destructive message to the server 104. For example, the user provides its input on the user device 102a to initiate sending the self-destructive message to other users through the server 104. Upon receiving the user input, the user device 102a is configured to send the self-destructive message, its respective category and the timing related information to the server 104. At 306, a determination is made as to whether the sending user is authorized to send the self-destructive message. At step 308, the sending user is logged out when it is determined that the sending user is not authorized to send the self-destructive message.

Otherwise, at step 310 the sending user is provided a first interface to add plain text message which is to be sent as the self-destructive message.

At step 312, a determination is made as to sensitivity associated with the self-destructive message. In other words, the category of the self-destructive message is determined. In an embodiment, the category of the self-destructive message can include the low sensitivity based category, the medium sensitivity based category and the high sensitivity based category. The method 300 is configured to follow different security protocols required to achieve security for the self-destructive message depending on the type of the category of the self-destructive message.

The method 300 proceeds to step 314 when the self-destructive message is classified in the low sensitive based category. At step 314, a static key is used to encrypt the self-destructive message. In an embodiment, the static key is stored within a code of the application configured in the user device 102a. Subsequently, at step 316, the low sensitive message is ciphered using a triple data encryption algorithm (TDES) and at step 318, the low sensitive message is sent to the server 104. The steps 314 and 316 form at least a part of steps included in the first security protocol implemented for sending the low sensitive self-destructive message to the server 104.

The method 300 proceeds to step 320 when the self-destructive message is classified in the medium sensitive category. At step 320, a dynamically generated key is used to encrypt the self-destructive message. Subsequently, at step 322, the medium sensitive message is ciphered using an advanced encryption standard (AES) and at step 318, the medium sensitive message is sent to the server 104. The steps 320 and 322 form at least a part of steps included in the second security protocol implemented for sending the medium sensitive self-destructive message to the server 104. The method 300 proceeds to step 402 when the self-destructive message is classified in the high sensitivity based category.

Figure 4:
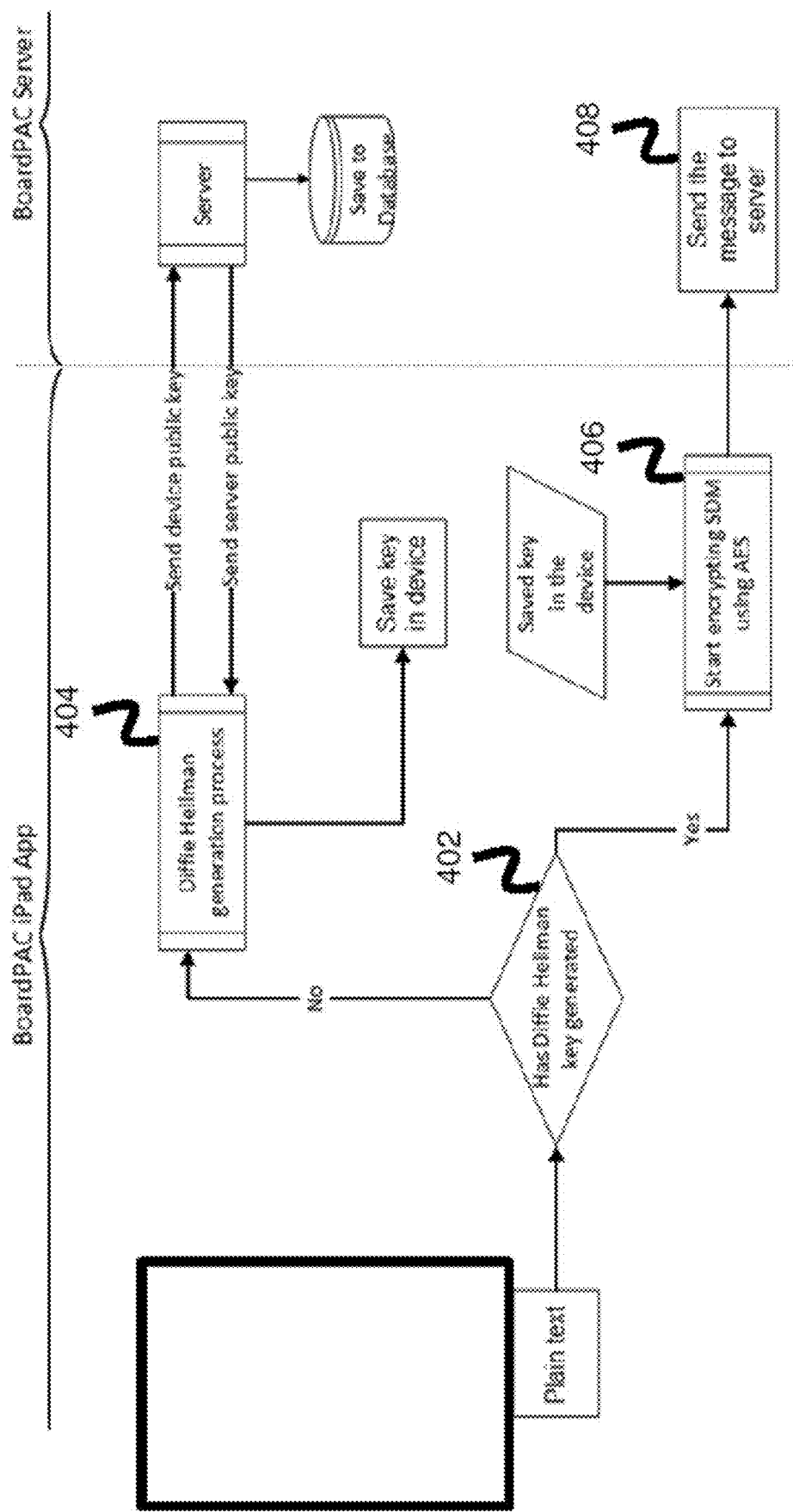
FIG. 4 illustrates exemplary steps of a method for sending a highly sensitive self-destructive message to the server in accordance with an embodiment of the systems and methods described herein.

FIG. 4 illustrates exemplary steps of a method for sending the highly sensitive self-destructive message to the server 104 in accordance with an embodiment of the systems and methods described herein. Upon receipt of the text message associated with the highly sensitive self-destructive message, the method 400 initiates at step 402, a determination is made as to whether Diffie Hellman key is generated between the sending user device 102 and the server 104 to transmit the highly sensitive self-destructive message from the sending user device 102 to the server 104. The method proceeds to step 404 when the Diffie Hellman key is not generated. At step 404, a Diffie Hellman generation process is performed between the sending user device 102 and the server 104, wherein the sending user device 102 is configured to send a public key to the server 104 and in return the server 104 sends a server public key to the sending user device 102. After sharing the respective public keys, a diffie Hellman key is generated at the server 104 using the public key of the sending user device 102 and another diffie Hellman key is generated at the sending user device 102 using the public key of the server 104. The diffie Hellman keys thus generated are stored at their respective locations. For example, the diffie Hellman key generated at the server 104 is stored in a database accessible to the server 104 and the diffie Hellman key generated key at the sending user device 102 is stored in the sending user device 102.

The method proceeds to step 406, when it is determined that the Diffie Hellman key is generated. At step 406, the high sensitive self-destructive message is encrypted using the generated Diffie Hellman key stored in the sending user device 102 and using the AES. Subsequently, at step 408, the high sensitive self-destructive message is sent to the server 104. The steps 402 to 408 form at least a part of steps included in the third security protocol implemented for sending the high sensitive self-destructive message to the server 104.

Figure 5:
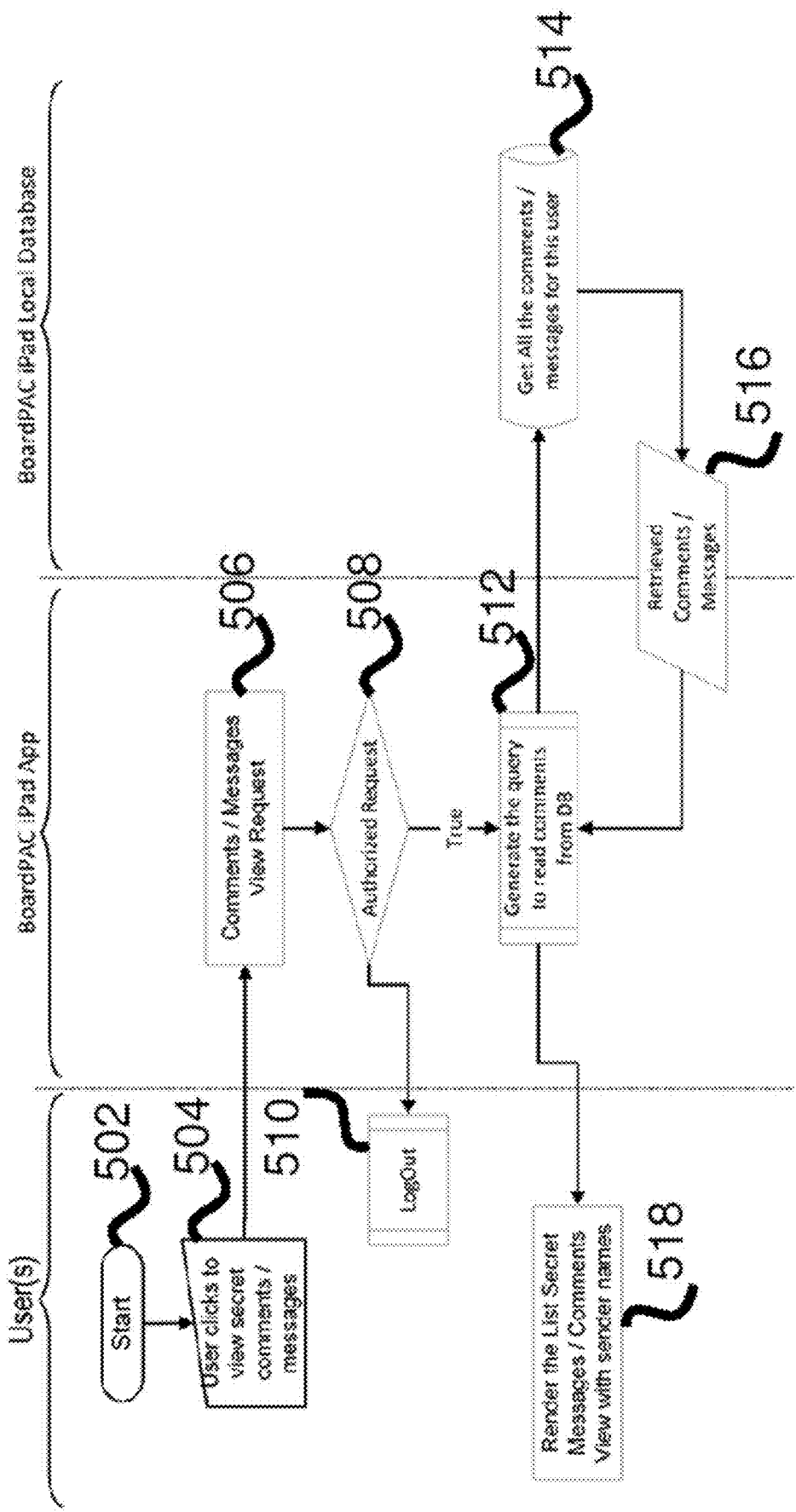
FIG. 5 illustrates exemplary steps of a method for displaying a list of self-destructive messages on a user interface of a receiving user in accordance with an embodiment of the systems and methods disclosed herein.

FIG. 5 illustrates exemplary steps of a method for displaying a list of self-destructive messages on a user interface of the receiving user device 102 in accordance with an embodiment of the systems and methods disclosed herein. The method 500 initiates at step 502 wherein the user interface is displayed to the user to start a process of viewing the self-destructive messages. In an embodiment, the self-destructive messages are of confidential or non-confidential nature and can be a part of a privileged communication. Such self-destructive messages include information which is meant only for the receiving user of the self-destructive messages and is not meant for any other user. At step 504, the receiving user selects an option to view the self-destructive messages. The receiving user may utilize input devices such as a keyboard, a mouse, a touch based screen or any other input device to select the option to view the self-destructive messages. For example, the receiving user may select an icon of a program which is configured to provide access to the receiving user to view the self-destructive messages.

At step 506, a request to view the self-destructive messages is generated. At step 508, a determination is made as to whether the receiving user is an authorized user to view the self-destructive messages. In an embodiment, an authorization decision is performed using authorization methods such as a user name and password-based authentication, a biometric authentication, a one-time password based authorization and among other authorization methods to prevent unauthorized access to the self-destructive messages. The method proceeds to step 510 wherein the receiving user is logged out of the application if it is determined that the receiving user is not authorized to access the self-destructive messages.

The method proceeds to step 512, if it is determined that the receiving user is authorized to access the self-destructive messages. At step 514, a query to read the self-destructive messages from a local database is executed in accordance with a database language of the local database. At step 516, the self-destructive messages are received from the local database. Subsequently, at step 518 the method 500 is configured to render the self-destructive messages in a form of list along with sending user to the user interface of the receiving user device 102.

Figure 6:
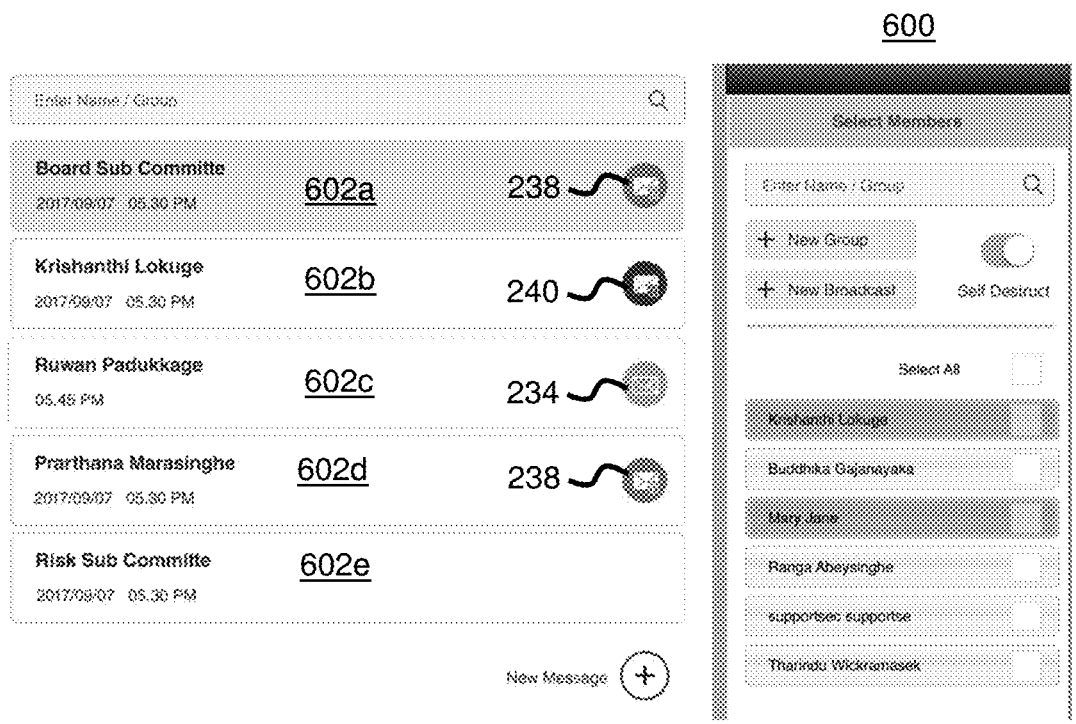
FIG. 6 illustrates an exemplary user interface displaying the list of self-destructive messages on a receiving user device in accordance with an embodiment of the systems and methods disclosed herein.

FIG. 6 illustrates an exemplary user interface displaying the list of self-destructive messages on the receiving user device 102 in accordance with an embodiment of the systems and methods disclosed herein. The user interface 600 includes a plurality of self-destructive messages such as a self-destructive message 602a, a self-destructive message 602b, a self-destructive message 602c, and a self-destructive message 602d. Each of the plurality of self-destructive messages includes at least an information regarding sending user's name or a group's name so that the receiving user can identify the sender of the respective self-destructive messages. Further, for each self-destructive message, a respective category of the self-destructive message is highlighted for the receiving user. For example, the self-destructive message 602a has the category 238, the self-destructive message 602b has the category 240, the self-destructive message 602c has the category 234 and the self-destructive message 602d has the category 238. That is to say, the self-destructive message 602a and the self-destructive message 602d are received at the receiving user device 102 through a medium level of protection due to the medium level of protection associated with the category 238. The self-destructive message 602b is received at the receiving user through a highest level of protection as the highest level of protection is associated with the category 240. The message self-destructive 602e does not have any category which indicates that the 602e is not a self-destructive message and will remain in the receiving user device 102 till the receiving user deletes the message from the receiver.

Figure 7:
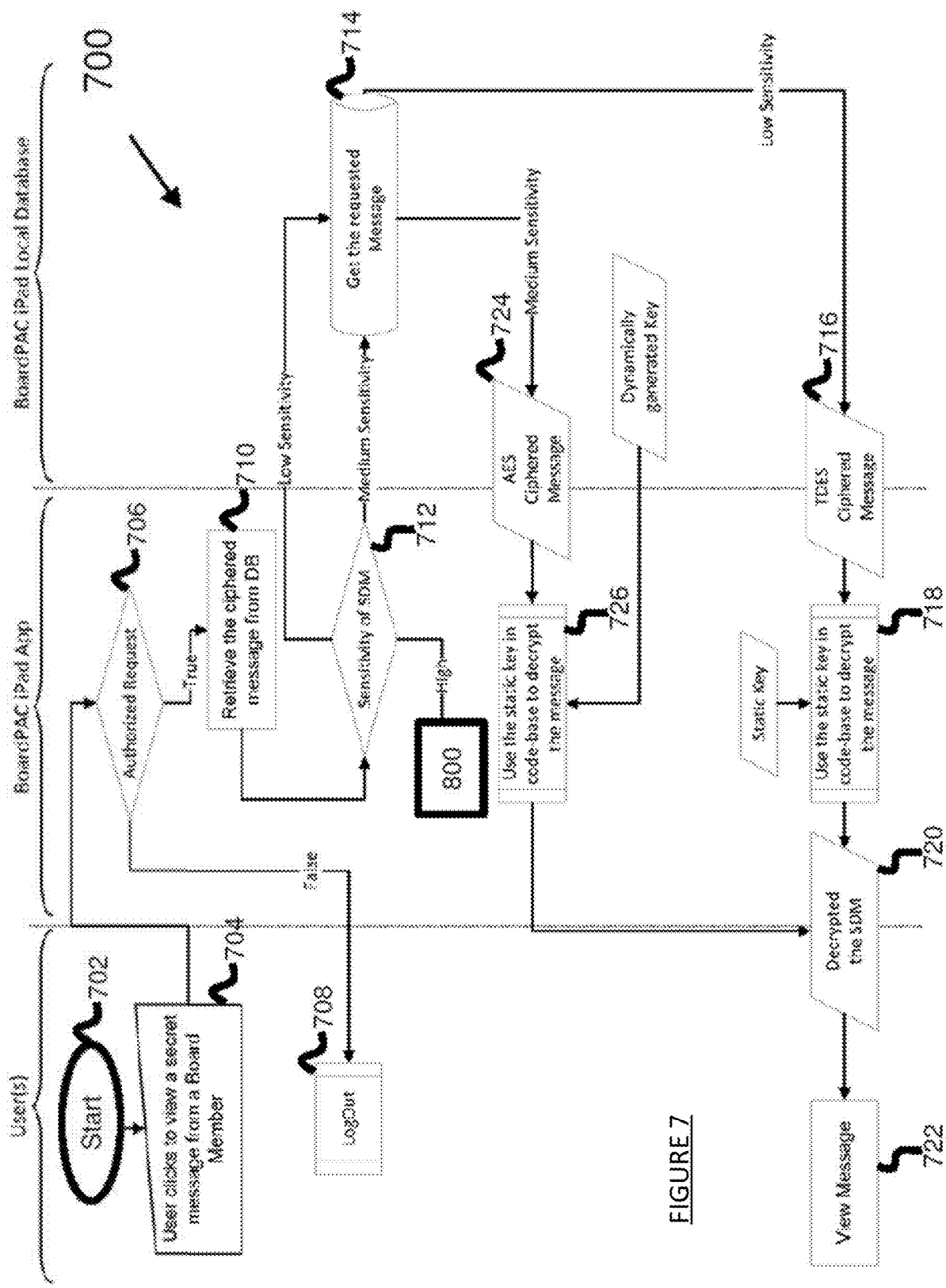
FIG. 7 illustrates exemplary steps of a method for receiving self-destructive messages of low sensitivity and medium sensitivity in accordance with an embodiment of the systems and methods described herein.

FIG. 7 illustrates exemplary steps of a method 700 for receiving self-destructive messages of low sensitivity and medium sensitivity in accordance with an embodiment of the methods and systems described herein. The method 700 initiates at step 702 and proceeds to step 704.

At step 704, the receiving user clicks to view the self-destructive message from the list of self-destructive messages presented to the receiving user for example, in the portion 206 of the user interface 200 or the user interface 400. Subsequently, at step 706, a determination is made as to whether the receiving user is authorized to access the selected message. At step 708, the receiving user is logged out of the application when it is determined that the receiving user is not authorized to view the self-destructive message. The authorization ascertains that only the intended receiving user of the self-destructive message has logged in the application.

The method proceeds to step 710 if it is determined that the receiving user is authorized to access the self-destructive message. At step 710, the self-destructive message in its ciphered form is derived from the database. At step 712, a determination is made regarding the sensitivity associated with the self-destructive message. The sensitivity of the self-destructive message can be a low sensitivity, a medium sensitivity and a high sensitivity depending on the category of the self-destructive message. Depending on the sensitivity of the self-destructive message, a respective security protocol is processed to receive the self-destructive message at the receiving user device 102. The method 700 proceeds to a method 800 when it is determined that the self-destructive message has a corresponding high sensitivity category.

The method proceeds to step 714 when it is determined that the self-destructive message has either a medium sensitivity or a low sensitivity. At step 714, the self-destructive message is extracted from the database and processed depending on the sensitivity associated with the self-destructive message.

The method proceeds to step 716 when the self-destructive message is associated with the low sensitivity. Since the low sensitive message is ciphered using the triple data encryption algorithm (TDES), the self-destructive message received from the database is a TDES ciphered message. Subsequently, at step 718, a static key is selected and at step 720, the TDES ciphered message is decrypted to extract the contents therein. At step 722, the decrypted self-destructive message is shown to the receiving user interface.

The method proceeds to step 724 when the self-destructive message is associated with the medium sensitivity. Since the medium sensitive message is ciphered using the advanced encryption standard (AES), the self-destructive message received from the database is an AES ciphered message. In order to decipher the AES ciphered message, a dynamically generated key from the local database is received and at step 726, the dynamically generated key is used to decrypt the self-destructive message. At step 722, the decrypted self-destructive message is shown to the receiving user interface.

Figure 8:
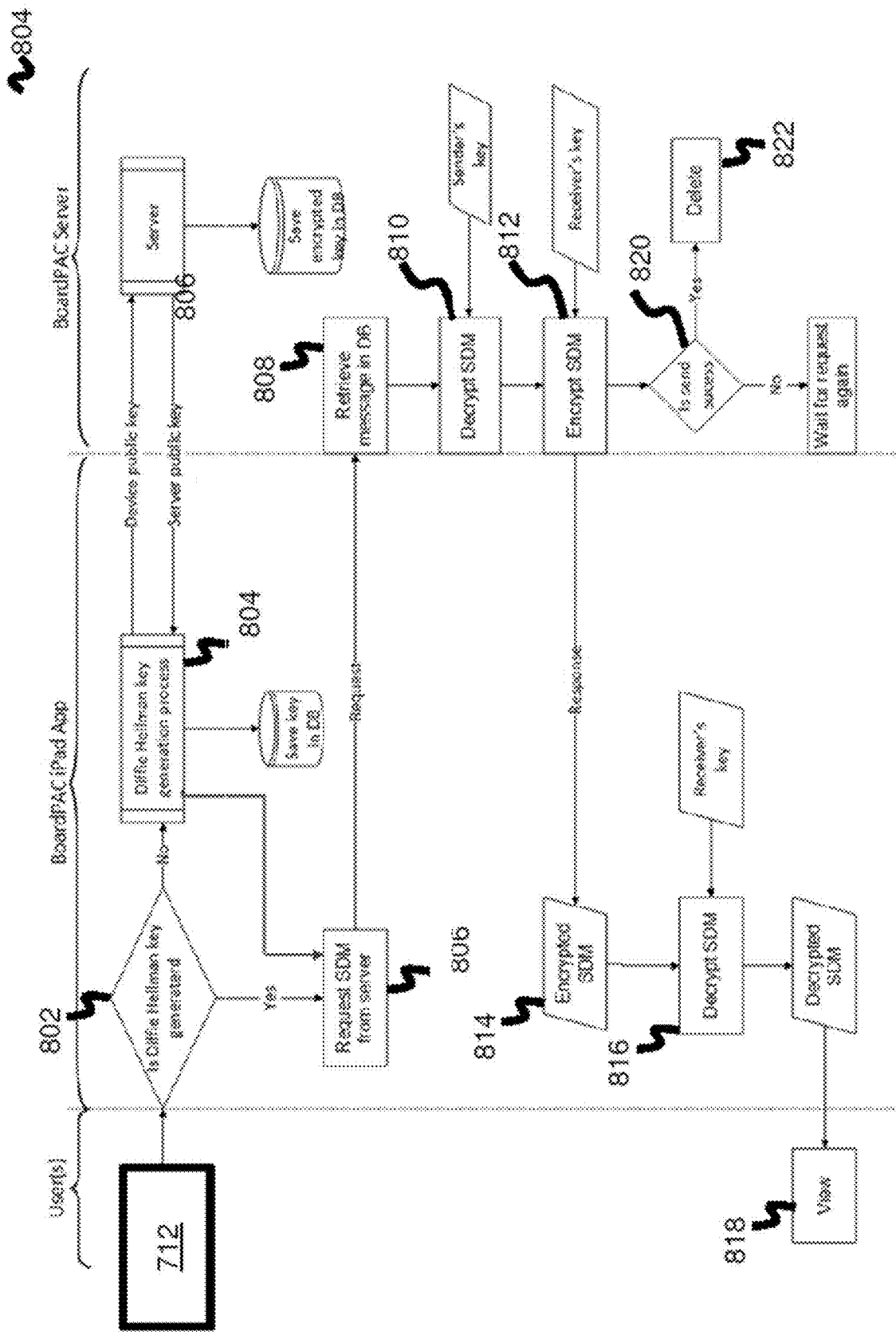
FIG. 8 illustrates exemplary steps of a method for receiving the highly sensitive message in accordance with an embodiment of the systems and methods described herein.

FIG. 8 illustrates exemplary steps of a method 800 for displaying the high sensitive message to the receiving user in accordance with an embodiment of the methods and systems described herein. The method 800 starts from the step 712 when it is determined that the self-destructive message is of the high sensitivity and proceeds to step 802.

At step 802, a determination is made as to whether Diffie Hellman key is generated to transmit the high sensitive self-destructive message from the server 104 to the receiving user device 102. The method proceeds to step 804 when the Diffie Hellman key is not generated. At step 804, a Diffie Hellman key generation process is performed between the server 104 and the receiving user device 102, wherein the receiving user device 102 is configured to send a public key to the server 104 and in return the server 104 is configured to send its public key to the receiving user device 102.

After sharing the respective public keys, a diffie Hellman key is generated at the server 104 using the public key of the receiving user device 102 and another diffie Hellman key is generated at the receiving user device 102 using the public key of the server 104. The diffie Hellman keys thus generated are stored at their respective locations. For example, the diffie Hellman key generated at the server 104 is stored in a database accessible to the server 104 and the diffie Hellman key generated key at the receiving user device 102 is stored in the receiving user device 102.

The method proceeds to step 806 when it is determined that the Diffie Hellman key is generated. At step 806, the receiving user device 102 is configured to send a request to receive the high sensitive self-destructive message to the server 104. The high sensitive self-destructive message is available at the server only rather than the low sensitive or medium sensitive self-destructive messages which were available at the local database associated with the receiving user device 102. At step 808, the server 104 is configured to retrieve the encrypted form of the high sensitive self-destructive message intended for the receiving user device 102. At step 810, the server 104 is configured to decrypt the high sensitive self-destructive message using the saved diffie Hellman key of the sending user device 102 which has sent the self-destructive message to the server 104. Since the server 104 has the saved diffie Hellman key of the receiving user device 102, at step 812, the server 104 is configured to encrypt the self-destructive message using the saved diffie Hellman key of the receiving user device 102.

At step 814, the encrypted form of the high sensitive self-destructive message is sent to the receiving user device 102. At step 816, the receiving user device 102 is configured to decrypt the encrypted form of the high sensitive self-destructive message as received from the server 104 using the public key of the server 104. At step 818, the receiving user device 102 is configured to display the decrypted self-destructive message to the receiving user.

In addition, at step 820, a determination is made as to whether the receiving user device 102 has received the encrypted form of the high sensitive self-destructive message for successfully transmission of the high sensitive self-destructive message. The method proceeds to step 822 when it is determined that the receiving user device 102 has received the self-destructive message. At step 822, the high sensitive self-destructive message is deleted from the server 104. The method proceeds to step 824 when it is determined that the receiving user device 102 has not received the self-destructive message. At step 824, the server 104 is configured to wait for a duplicate request to receive the self-destructive message from the receiving user device 102. The self-destructive message is not deleted from the server 104 till the receiving user device 102 has not successfully received the self-destructive message.

Figure 9:
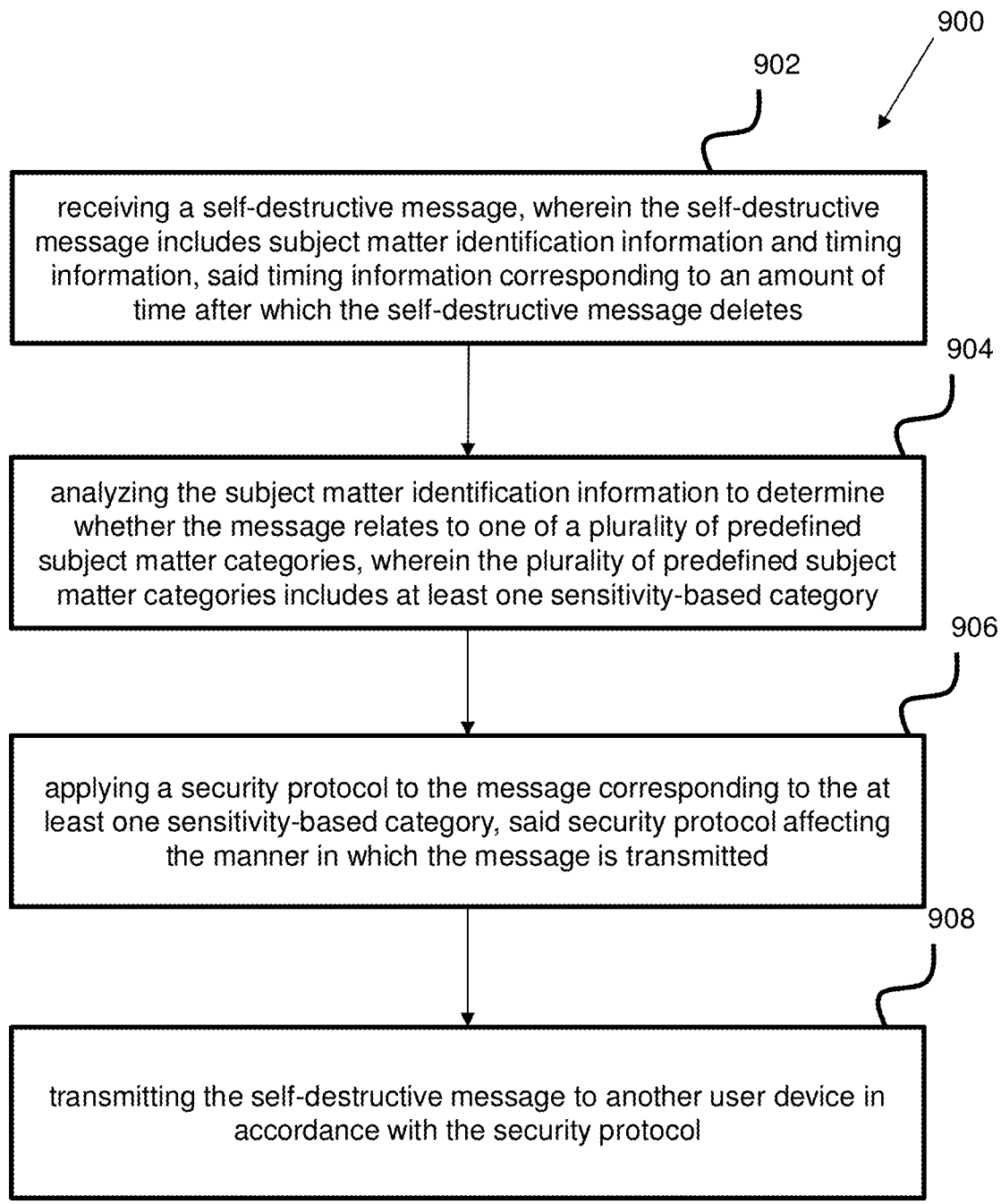
FIG. 9 illustrates exemplary steps of a method for communicating a self-destructive message in accordance with an embodiment of the systems and methods described herein.

FIG. 9 illustrates exemplary steps of a method 900 for communicating a self-destructive message in accordance with an embodiment of the systems and methods described herein. The method proceeds at step 902, wherein the method 900 is configured to receive a self-destructive message, wherein the self-destructive message includes subject matter identification information and timing information, said timing information corresponding to an amount of time after which the self-destructive message deletes.

At step 904, the method 900 is configured to analyze the subject matter identification information to determine whether the message relates to one of a plurality of predefined subject matter categories, wherein the plurality of predefined subject matter categories includes at least one sensitivity-based category. At step 906, a security protocol to the message corresponding to the at least one sensitivity-based category is applied, said security protocol affecting the manner in which the message is transmitted. At step 908, the method 900 is configured to transmit the self-destructive message to another user device in accordance with the security protocol.

Figure 10A:
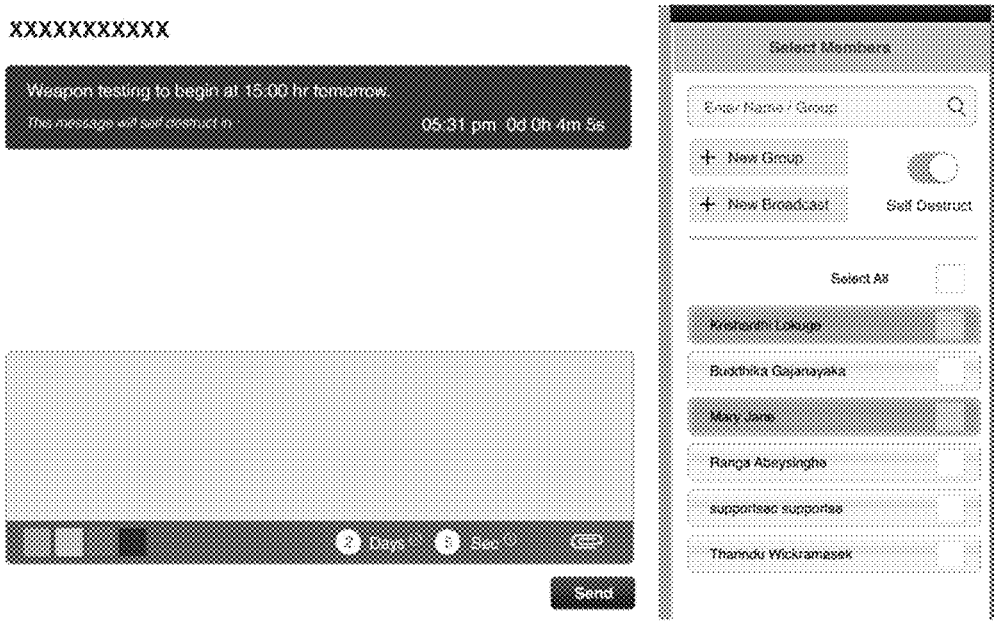
FIGS. 10A-B illustrate a first and a second view of the self-destructive message in accordance with an embodiment of the systems and methods described herein.
Figure 10B:
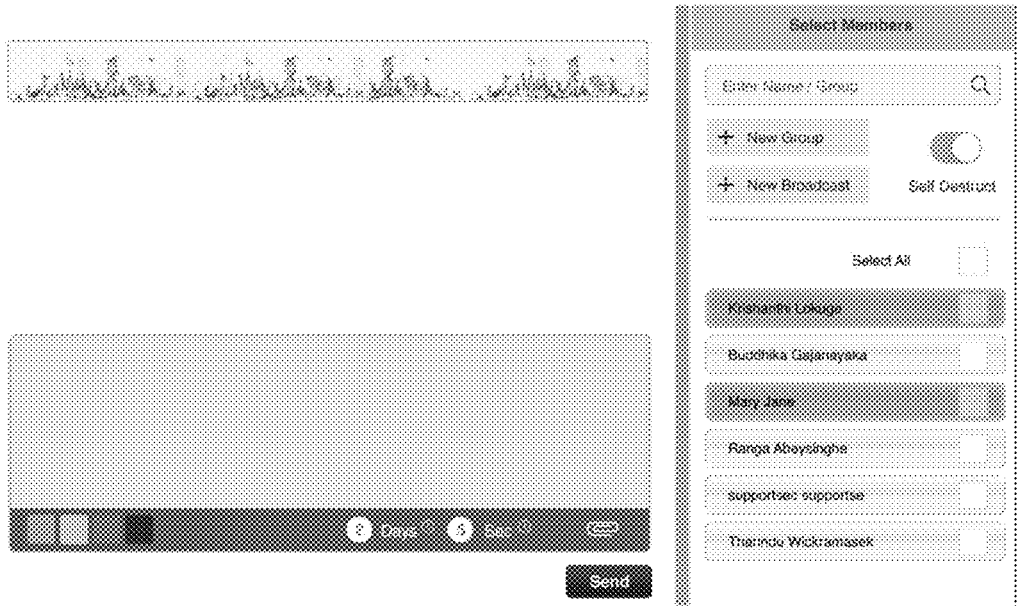

FIGS. 10A and 10B illustrate a first and a second view of the self-destructive message respectively in accordance with embodiments of the systems and methods described herein. FIG. 9A illustrates the first view of the self-destructive message wherein in addition to the content of the self-destructive message an information is displayed to the receiving user that the self-destructive message will be deleted from the receiving user device 102 after the expiry of the self-destructive interval. FIG. 9B illustrates the second view of the self-destructive message after expiry of the self-destructive interval. As illustrated, a visual is shown to the receiving user indicating that the self-destructive message has been deleted from the receiving user device 102. As the self-destructive message is already deleted from the server 104 and after reading the self-destructive message, the self-destructive message is deleted from the receiving user device 102 too, the methods and systems enabled the users to maintain the confidentiality of the information even if the device has been hacked or misused by the unauthorized user.

In order to address various issues and advance the art, the entirety of this application shows by way of illustration various embodiments in which the claimed innovations may be practiced. The advantages and features of the application are of a representative sample of embodiments only, and are not exhaustive or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural or topological modifications may be made without departing from the scope or spirit of the disclosure. As such, all examples or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical or topological structure of any combination of any program components (a component collection), other components or any present feature sets as described in the figures or throughout are not limited to a fixed operating order or arrangement, but rather, any disclosed order is exemplary and all equivalents, regardless of order, are contemplated by the disclosure. Furthermore, it is to be understood that such features are not limited to serial execution, but rather, any number of threads, processes, services, servers, or the like that may execute asynchronously, concurrently, in parallel, simultaneously, synchronously, or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, or the like thereof. As such, it should be understood that advantages, embodiments, examples, functional, features, logical, operational, organizational, structural, topological, or other aspects of the disclosure are not to be considered limitations on the disclosure as defined by the claims or limitations on equivalents to the claims.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved data analysis methods, systems and machine-readable programs for carrying out the same. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A computer system including memory circuitry coupled to processing circuitry to provide an electronic tool to a user to facilitate communicating self-destructive messages between a first user and a second user via at least one processor circuit, wherein the at least one processor circuit is programmed to: render indicia identifying a plurality of message categories on a first user interface of a first user device for the first user, wherein each message category corresponds to a respective security level required to be established for the message until the message is read by the second user on a second user interface of a second user device;
   receive at the server the message, at least one message category, and a message display interval from the first user device in accordance with the security level associated with the at least one message category;
   authenticate a request of the second user to access the message; and
   transmit the message, the at least one message category and the message display interval from the server toward the second user device in accordance with the security level associated with the at least one message category, wherein the second user device is configured to destruct the message on expiry of the message display interval.

2. The computer system of claim 1, wherein the plurality of message categories includes a highly sensitive message, a medium level sensitive message, a low-level sensitive message and a normal message.

3. The system as claimed in claim 1, wherein the at least one processor circuit is further programmed to transmit the message from the first user device to the server or from the server to the second user device using:
   a first security protocol when the at least one message category corresponds to the low-level sensitive message;
   a second security protocol when the at least one message category corresponds to the medium level sensitive message; and
   a third security protocol when the at least one message category corresponds to the highly sensitive message.

4. The system as claimed in claim 1, wherein the at least one processor circuit is further programmed to:
   receive current geographic co-ordinates of the first user and the second user;
   compare the current geographic co-ordinates of the first user and the second user with respective pre-stored geographic co-ordinates of the first user and the second user to determine location of the first user and the second user within or near to a predetermined location; and
   authorize the first user and the second user to establish communication of the self-destructive messages, when the current geographic co-ordinates of the first user and the second user are found within or near to the predetermined location.

5. The system as claimed in claim 4, wherein the at least one processor circuit is further programmed to:
   receive authentication related information from the first user or the second user from another computing device; and
   determine a presence of a suspicious activity based on the authentication related information and the current geographic co-ordinates of the first user or the second user, wherein the presence of suspicious activity indicates a presence of an intruder as the first user or the second user.

6. The system as claimed in claim 2, wherein the at least one processor circuit is further programmed to:
   provide instructions to the first user device to cipher the message using a triple data encryption algorithm (TDES) before transmitting the message to the server, when the at least one message category corresponds to the low-level sensitive message; and
   provide instructions to the second user device to decipher the message using the triple data encryption algorithm (TDES) upon receiving the message from the server.

7. The system as claimed in claim 2, wherein the at least one processor circuit is further programmed to:
   provide instructions to the first user device to cipher the message using an advanced encryption standard (AES) before transmitting the message to the server, when the at least one message category corresponds to the medium level sensitive message;
   provide instructions to the second user device to decipher the message using the advanced encryption standard (AES) upon receiving the message from the server.

8. The system as claimed in claim 2, wherein the at least one processor circuit is further programmed to:
   provide instructions to the first user device to cipher the message using at least Diffie Hellman keys before transmitting the message to the server, when the at least one message category corresponds to the highly sensitive message; and
   provide instructions to the second user device to decipher the message using the Diffie Hellman keys upon receiving the message from the server.

9. The system as claimed in claim 1, wherein the at least one processor circuit is further programmed to:
   configure the first user interface to receive a server store time indicating a time interval for storing the message at the server until another user reads the message; and
   configure the message such that the message is destroyed if the message is not read within the server store time.

10. A non-transitory machine-readable medium storing instructions executable by at least one processor circuit to provide an electronic tool to a user to facilitate communicating self-destructive messages between a first user and a second user via at least one processor circuit, wherein said instructions, when executed by the at least one processor circuit, cause the at least one processor circuit to:
    render indicia identifying a plurality of message categories on a first user interface of a first user device for the first user, wherein each message category corresponds to a respective security level required to be established for the message until the message is read by the second user on a second user interface of a second user device;
    receive at the server the message, at least one message category, and a message display interval from the first user device in accordance with the security level associated with the at least one message category;
    authenticate a request of the second user to access the message; and
    transmit the message, the at least one message category and the message display interval from the server toward the second user device in accordance with the security level associated with the at least one message category, wherein the second user device is configured to destruct the message on expiry of the message display interval.

11. The non-transitory machine-readable medium of claim 10, wherein the plurality of message categories includes a highly sensitive message, a medium level sensitive message, a low-level sensitive message and a normal message.

12. The non-transitory machine-readable medium of claim 11, further comprising instructions to cause the at least one processor circuit to transmit the message from the first user device to the server or from the server to the second user device using:
  a first security protocol when the at least one message category corresponds to the low-level sensitive message;
  a second security protocol when the at least one message category corresponds to the medium level sensitive message; and
  a third security protocol when the at least one message category corresponds to the highly sensitive message.

13. The non-transitory machine-readable medium of claim 10, further comprising instructions to cause the at least one processor circuit to:
  receive current geographic co-ordinates of the first user and the second user;
  compare the current geographic co-ordinates of the first user and the second user with respective pre-stored geographic co-ordinates of the first user and the second user to determine location of the first user and the second user within or near to a predetermined location; and
  authorize the first user and the second user to establish communication of the self-destructive messages, when the current geographic co-ordinates of the first user and the second user are found within or near to the predetermined location.

14. The non-transitory machine-readable medium of claim 13, further comprising instructions to cause the at least one processor circuit to:
  receive authentication related information from the first user or the second user from another computing device; and
  determine a presence of a suspicious activity based on the authentication related information and the current geographic co-ordinates of the first user or the second user, wherein the presence of suspicious activity indicates a presence of an intruder as the first user or the second user.

15. The non-transitory machine-readable medium of claim 11, further comprising instructions to cause the at least one processor circuit to:
  provide instructions to the first user device to cipher the message using a triple data encryption algorithm (TDES) before transmitting the message to the server, when the at least one message category corresponds to the low-level sensitive message; and
  provide instructions to the second user device to decipher the message using the triple data encryption algorithm (TDES) upon receiving the message from the server.

16. The non-transitory machine-readable medium of claim 11, further comprising instructions to cause the at least one processor circuit to:
  provide instructions to the first user device to cipher the message using an advanced encryption standard (AES) before transmitting the message to the server, when the at least one message category corresponds to the medium level sensitive message; and
  provide instructions to the second user device to decipher the message using the advanced encryption standard (AES) upon receiving the message from the server.

17. The non-transitory machine-readable medium of claim 11, further comprising instructions to cause the at least one processor circuit to:
  provide instructions to the first user device to cipher the message using at least Diffie Hellman keys before transmitting the message to the server, when the at least one message category corresponds to the highly sensitive message; and
  provide instructions to the second user device to decipher the message using the Diffie Hellman keys upon receiving the message from the server.

18. The non-transitory machine-readable medium of claim 10, further comprising instructions to cause the at least one processor circuit to:
  configure the first user interface to receive a server store time indicating a time interval for storing the message at the server until another user reads the message; and
  configure the message such that the message is destroyed if the message is not read within the server store time.

* * * * *